Patented Mar. 28, 1939

2,152,186

UNITED STATES PATENT OFFICE 2,152,186

DYESTUFFS OF THE ANTHRAQUINONE SERIES

Donald P. Graham, Wilmington, Del., assignor to E. I. du Pont de Nemours & Company, Wilmington, Del., a corporation of Delaware No Drawing. Application June 25, 1938, Serial No. 215,874

2 Claims. (Cl. 260—316)

This invention relates to the preparation of new dyestuffs of the anthraquinone series and has for its object the preparation of anthrimid-carbazole dyestuffs of the general formula:

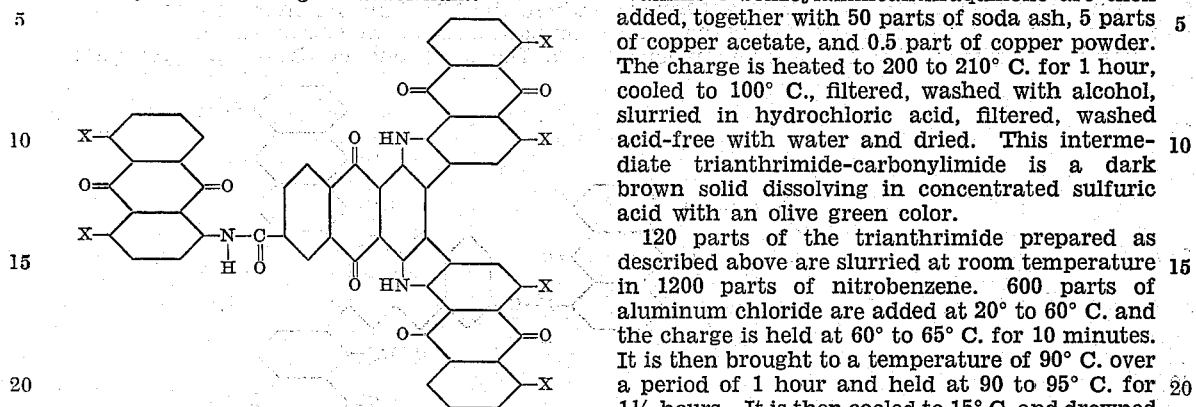

where the X's stand for hydrogen or an aroylamino radical of the benzene series. These dyestuffs dye in brown to red brown shades and all exhibit good fastness properties.

The dyestuffs of this invention are prepared from 1:4-dichloro-6-anthraquinonecarbonyl chloride, an intermediate which heretofore has not been extensively used in the preparation of dyestuffs, but which because of the beta-carbonyl group, I have found give dyestuffs which dye in desirable fast shades not readily obtainable from other anthraquinone intermediates. They are particularly suitable for use as cold dyeing colors, and exhibit good fastness properties.

According to my invention, 1:4-dichloro-6-anthraquinonecarbonyl chloride is condensed through the 6-carbonyl group with one mole of an amino-anthraquinone (which may also carry an aroylamino substituent). The resulting compound is then condensed with two moles of the same or a different alpha-amino-anthraquinone (which may, and preferably does, carry an aroylamino substituent). The resulting trianthrimide is then subjected to an acid ring-closure, to give what is generally referred to as an anthrimide-carbazole. This product is isolated and purified by the usual acid pasting and oxidation procedure.

The following examples are given to illustrate the invention. The parts used are by weight.

Example 1

34 parts of 1:4-dichloro-6-anthraquinonecarbonyl chloride and 34 parts of 1-amino-5-benzoylaminoanthraquinone are slurried in 1200 parts of nitrobenzene and heated to 150 to 160° C. for 30 to 40 minutes. 70 parts additional 1-amino-5-benzoylaminoanthraquinone are then added, together with 50 parts of soda ash, 5 parts of copper acetate, and 0.5 part of copper powder. The charge is heated to 200 to 210° C. for 1 hour, cooled to 100° C., filtered, washed with alcohol, slurried in hydrochloric acid, filtered, washed acid-free with water and dried. This intermediate trianthrimide-carbonylimide is a dark brown solid dissolving in concentrated sulfuric acid with an olive green color.

120 parts of the trianthrimide prepared as described above are slurried at room temperature in 1200 parts of nitrobenzene. 600 parts of aluminum chloride are added at 20° to 60° C. and the charge is held at 60° to 65° C. for 10 minutes. It is then brought to a temperature of 90° C. over a period of 1 hour and held at 90 to 95° C. for 1½ hours. It is then cooled to 15° C. and drowned in 8000 parts of ice water. The slurry is stirred for several hours, and allowed to rise to room temperature. The water is decanted off and the tarry residue steam distilled until free from nitrobenzene. The crude color is isolated by filtration, washed and dried. The yield is essentially quantitative.

80 parts of crude color obtained as described above are dissolved at 5 to 8° C. in 1600 parts of 98% sulfuric acid. The solution is drowned in 10,000 parts of ice water and the slurry heated to 70° C. 100 parts of sodium dichromate are added and the charge heated to 90 to 95° C. for 3 hours, filtered, washed acid-free, and the cake diluted to the desired consistency and milled. The product is a brown paste dissolving in concentrated sulfuric acid with a violet color. It dyes cotton in brown shades from a violet vat.

Example 2

One molecular proportion of 1:4-dichloro-6-anthraquinonecarbonyl chloride is condensed with three molecular proportions of 1-amino-4-benzoylaminoanthraquinone following the general procedure outlined in the first paragraph of the preceding example. 20 parts of this condensation product are added to a melt consisting of 50 parts of aluminum chloride in 100 parts of pyridine at 100° C. The charge is heated to 160° C. for 1 hour, allowing some pyridine to distill off, and then cooled to room temperature. The resulting cake is pulverized and extracted with a solution of 200 parts of sodium hydroxide in 2000 parts of cold water. The resulting slurry is oxidized by air blowing, filtered, washed alkali-free, and dried. This crude color is a dark brownish Bordeaux solid dissolving in sulfuric acid with an olive green color.

1 part of crude color is dissolved in 20 parts of 99% sulfuric acid at 5 to 8° C. The solution is drowned in 100 parts of ice water and the slurry heated to 70° C. 1 part of sodium dichromate is added and the slurry is heated to 90° C. for 1 hour. It is then filtered, washed acid-free and the cake pasted in the usual manner.

The product is a dark colored paste which dissolves in sulfuric acid with a brownish Bordeaux color and dyes cotton in Bordeaux brown shades from a red brown vat.

*Example 3*

If 1-aminoanthraquinone is substituted for 1-amino-4-benzoylaminoanthraquinone in the synthesis described in the preceding example, an analogous dyestuff free of benzoylamino groups is obtained. This product dissolves in sulfuric acid with a violet color and dyes cotton in brown shades from a red brown vat.

It will be apparent that the amino-anthraquinone condensed through the halogen in the 1 and 4 positions on the 1:4-dichloro-6-anthraquinone-6-carbonyl group. Other aroylamino-substituted aminoanthraquinones such as 1-amino-4 (or 5) toloyl-aminoanthraquinone may be employed to give products which dye in the same general shades as those specifically illustrated above.

I claim:

1. The compounds of the general formula:

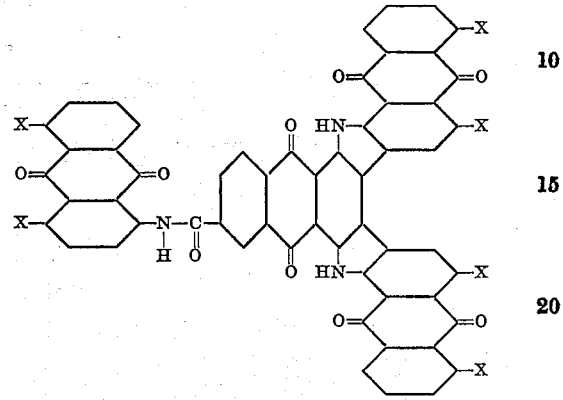

where the X's stand for hydrogen or an aroylamino radical of the enzene series.

2. The compound of the general formula:

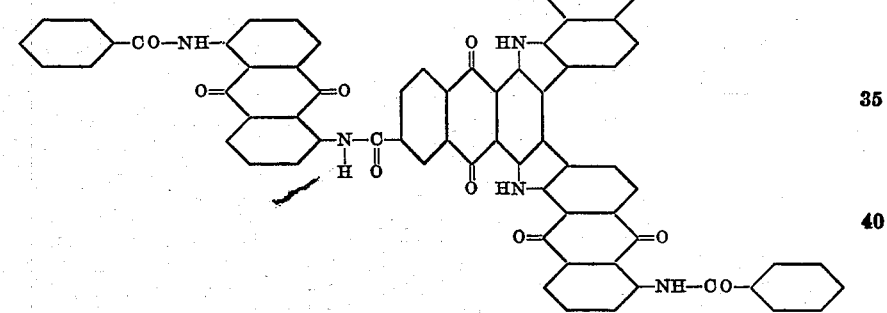

carbonyl chloride by the Ullmann reaction, need not be the same as the amino-anthraquinone molecule which has been condensed through the which dyes cotton in brown shades from a violet vat.

DONALD P. GRAHAM.